March 31, 1959   E. I. BROWN   2,879,745
DUAL THROTTLING MOTOR CONTROL CIRCUIT
Filed March 22, 1955
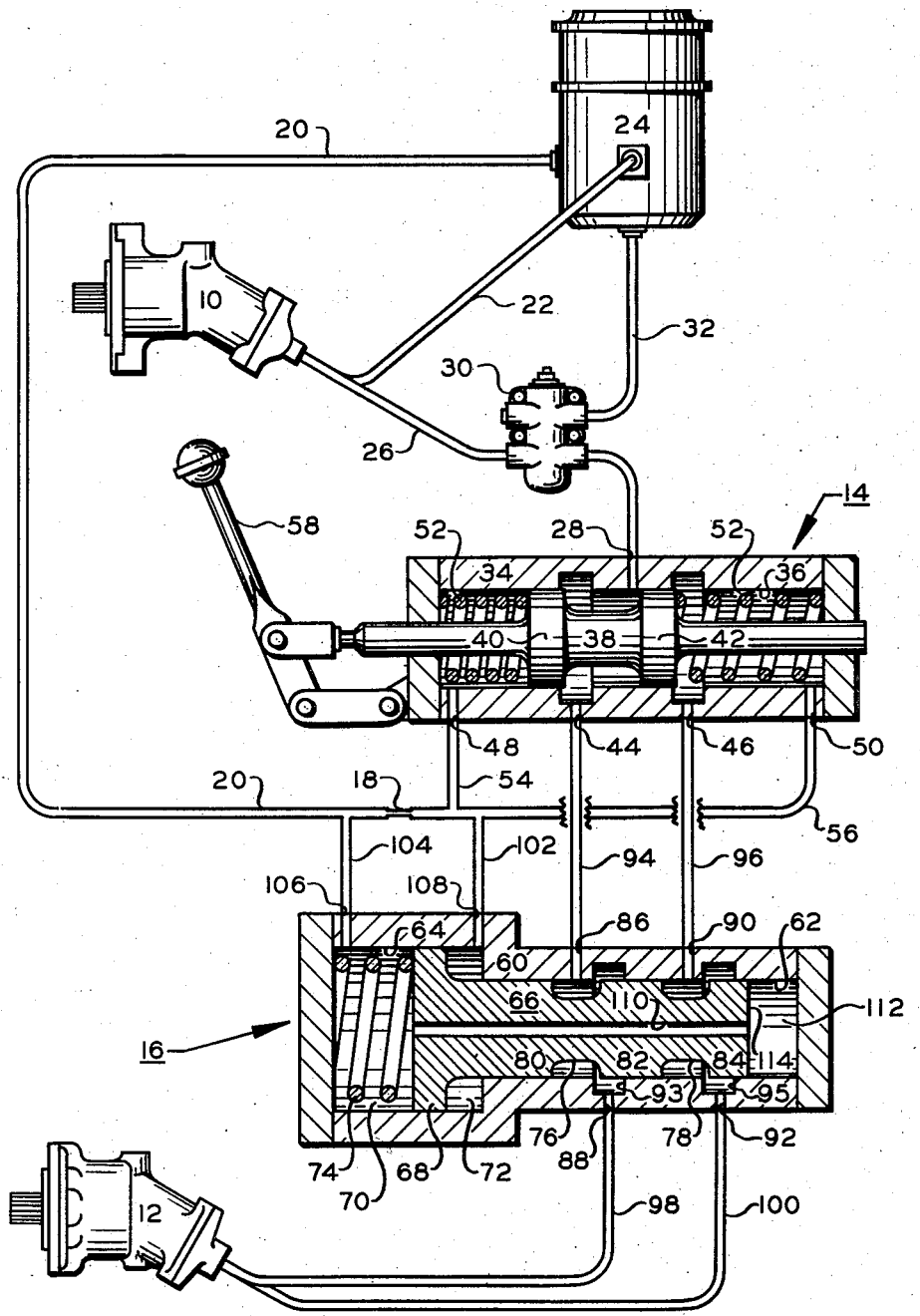
INVENTOR.
EDWARD I. BROWN
BY
ATTORNEY though to be an aircraft engine, not shown, which energizes a fluid motor 12 adapted for driving a load device such as a flight control surface of an aircraft. A manually operated four-way directional control valve 14 is utilized for selectively controlling the starting, stopping
United States Patent Office 2,879,745
Patented Mar. 31, 1959

2,879,745
DUAL THROTTLING MOTOR CONTROL CIRCUIT

Edward I. Brown, Encino, Calif., assignor to Vickers Incorporated, Detroit, Mich., a corporation of Michigan Application March 22, 1955, Serial No. 495,890

7 Claims. (Cl. 121—38)

This invention relates to power transmissions, and is particularly applicable to those of the type comprising two or more fluid pressure energy translating devices, one of which may function as a pump and another as a fluid motor.

More particularly, the invention relates to such a transmission wherein the speed of the motor is to be accurately controlled and which is well adapted for applications wherein both opposing and overrunning loads are imposed on the motor.

In hydraulic power transmission systems for operating and controlling, for example, the flight control surface of an aircraft, precise control for accurate flight attitude is essential. Control of the motor must be attained in the face of variable factors and conditions such as the pump being driven from the aircraft engine and changing load conditions on the motor. It is important in many applications that accurate control be maintained in both directions of motor operation.

In the past, flow regulating mechanism of different types have been utilized in such motor control transmissions for controlling the flow rate to the motor, or from the motor, to provide what is conventionally known as either a meter-in or a meter-out circuit. The circuits in many instances would only provide a control of the motor where opposing loads were encountered. Where designed to provide control of motors in both directions of operation and upon which both overrunning and opposing loads were imposed, they contained a multiplicity of intricate valving and flow regulating mechanism.

It is therefore an object of this invention to provide an improved hydraulic power transmission system for controlling the speed of a fluid motor subjected to varying load conditions.

It is a further object of this invention to provide in such a transmission a system for controlling the motor in both directions of operation and in spite of both overrunning and opposing loads being imposed on the motor.

It is still another object of this invention to provide an improved, simpler, and a more economical and efficient hydraulic power transmission system for the purposes previously recited.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system embodying a preferred form of the present invention.

Referring to the single figure of the drawing there is shown a fluid pump 10 which may be driven by a prime mover such as an aircraft engine, not shown, which energizes a fluid motor 12 adapted for driving a load device such as a flight control surface of an aircraft. A manually operated four-way directional control valve 14 is utilized for selectively controlling the starting, stopping and directional operation of the motor. Simultaneous control of fluid flow to and from the motor for accurately controlling the speed thereof and for controlling an overrunning load as well as an opposing load on the motor is provided by a flow regulating device 16 of the pressure responsive dual throttle type and a throttle 18 in a common motor return line 20. The throttle 18 is disclosed as of the fixed type but may be of the adjustable type for changing the controlled flow rate of the system and for meeting a variety of system requirements.

The inlet of the pump 10 is connected by a conduit 22 to a fluid reservoir 24 and the outlet thereof connected by a pressure delivery conduit 26 to a pressure inlet port 28 of the four-way valve 14. Fluid in excess of the controlled flow rate is exhausted to the reservoir 24 by a relief valve 30 into a relief conduit 32 connected to the reservoir 24.

The four-way valve 14 comprises a body 34 with a longitudinal bore 36 closed at opposite ends thereof having shiftably mounted therein a valve spool 38. Valve spool 38 has spaced apart lands 40 and 42 for connecting the pressure port 28 to either one of motor ports 44 or 46 while connecting the motor port not so connected to tank port 48 or a tank port 50, all of which ports lead to the bore 36. The valve spool 38 is biased to a neutral position closing all ports from communication with each other by duplicate end springs 52. The tank ports 48 and 50 of the valve 14 are respectively connected to the common motor return line 20 by conduits 54 and 56. The valve spool extends from the body 34 for actuation thereof by a manually operated lever 58.

The flow regulating device 16 comprises a body member 60 having a longitudinal bore 62 enlarged at one end which is indicated by the numeral 64. A dual throttling valve, indicated generally by the numeral 66 is shiftably mounted in the bore 62. The operating means for the throttling valve 66 comprises a control piston 68 mounted in the enlarged portion of the bore 64 to form expansible chambers on opposite sides of the control piston 68 which are indicated by the numerals 70 and 72. The throttling valve 66 is biased toward the fully open position by a spring 74 the loading of which determines the pressure drop across the throttle 18 in the motor return line 20.

The throttling valve 66 is provided with spaced apart grooves 76 and 78 forming lands 80, 82 and 84 on opposite sides thereof which are shown in operating metering positions. The land 82 functions as a throttle valve across offset ports 86 and 88 in the body which lead to the valve bore 62 while the land 84 performs as a throttle valve for flow across offset ports 90 and 92 also leading to the valve bore 62. The valve bore 62 is provided with spaced apart ports 93 and 95 to which the external connection ports 88 and 92 lead and across which the lands 82 and 84 of the valve spool slide to open or close more fully the cooperating ports.

The motor ports 44 and 46 of the four-way valve 14 are respectively connected to the motor ports 86 and 90 of the power control valve 16 by conduits 94 and 96. The motor ports 88 and 92 of the power control valve 16 are respectively connected to opposite sides of the motor 12, either of which may be an inlet or an outlet side, by conduits 98 and 100. The conduit 94 and the conduit 98 thus form a continuous motor conduit with a variable throttle therein. Likewise, the conduit 96 and the conduit 100 form a continuous motor conduit also having a variable throttle therein.

In the position shown of the valve spool 38 of the four-way valve 14 the pump 10 is connected to the motor 12 across the ports 86 and 88 of power control valve 16 while return flow from the motor is conducted across the ports 92 and 90 of power control valve 16 to the directional control valve motor port 46, the latter of which is connected to the reservoir 24. The pressure in the common motor return line 20 ahead of the throttle 18 is transmitted to chamber 72 of the throttle valve 66 by a conduit 102 to act on one side of the control piston 68 while the pressure beyond the throttle 18 is transmitted to the chamber 70 to act on the opposite side of control piston 68 by a conduit 104. The chambers 70 and 72 are provided with control ports 106 and 108 leading therefrom to which the conduits 104 and 102 are respectively connected. The dual throttle valve 66 has a longitudinal passage 110 extending completely therethrough which connects the chamber 70 to a chamber 112 at the opposite end of the bore 62 for the transmission of pressure against an effective end surface 114. The total effective area of the operating means of the valve 66 exposed to pressures ahead of and beyond the throttle 18 in the motor return line 20 is thus equal to the area of the control piston 68 exposed to pressure in the control chamber 72.

In operation with the pump 10 being driven by a prime mover, such as an aircraft engine, and the directional control valve 14 in the position shown, the pressure port 28 of said valve is connected to the motor port 44 while the motor port 46 is connected to the tank port 50. Fluid delivery from the pump 10 is conducted by the pressure delivery conduit 26 and across the ports 28 and 44 of four-way valve 14 to the conduit 94 leading to the port 86 of the dual throttling flow regulating device 16. The land 82 of the dual throttling valve 66 throttles fluid across the valve bore port 93 to the external connection port 88 whence by conduit 98 a regulated flow rate is conducted to the motor 12 to operate the same in one direction of its operation. Fluid displacement of the motor 12 is conducted by conduit 100 to the external connection port 92 of flow regulating device 16 and to the valve bore port 95 whence it is throttled by land 84 of the dual throttling valve 66 to the external connection port 90. Fluid from the motor is thence conducted to reservoir 24 by means of conduit 96, port 46, bore 36 and port 50 of directional valve 14, and the conduit 56.

Displacement from the motor must return to the reservoir 24 by means of the common motor return conduit 20 in which is located the throttle 18. The pressure existent in conduit 20 ahead of throttle 18 is transmitted to the control chamber 72 of the dual throttling valve 66 by means of conduit 102 and external connection port 108. The pressure beyond the throttle 18 in the conduit 20 is transmitted to the chamber 70 of dual throttling valve 66 by means of conduit 104 and external connection port 106 and by means of the longitudinal passage 110 of the throttling valve to the chamber 112. The opposed pressure responsive surface areas of the throttling valve 66 comprising surfaces of the control piston 68 in the chambers 70 and 72 and the end surface 114 in chamber 112 are thus exposed to pressures ahead of and beyond the throttle 18 and the throttling lands of the valve are modulated to simultaneously regulate fluid flow to and from the motor.

The dual throttling valve 66 operates in a manner to maintain a constant pressure drop across the throttle 18 and thus maintain the flow through the throttle at a constant controlled rate. Fluid in excess of the regulated flow rate is exhausted to reservoir 24 over the relief valve 30. The amount of the pressure drop is determined by the load of the spring 74. As the pressure drop across the throttle 18 is maintained constant the flow across the throttle will be constant and the speed of the motor thus remains constant in spite of a variance in load conditions. The motor 12 may be stopped to locate the load device driven thereby in a selected position by shifting the control spool 38 of four-way valve 14 to the centered motor stop position. In this position all ports of the valve are closed from communication with each other.

The dual throttling valve 66 also acts as an anti-overrunning device for the motor. For example, in the raising of the wing flaps of an aircraft the flow rate to the motor is not only regulated but also flow from the motor. The land 82 of the throttling device 66 regulates the fluid from the motor and maintains sufficient back pressure to not only provide a cushion but also to prevent overrunning of the motor. No fluid in excess of the regulated flow rate is permitted to pass through the flow regulating device.

When the handle 58 of directional valve 14 is shifted to the extreme rightward position the lands 40 and 42 of valve spool 38 connect the pressure port 28 to the motor port 46 while connecting the motor port 44 to the tank port 48. Motor 12 will be operated in the opposite direction by reason of fluid from pump 10 being delivered thereto by means of conduits 26, 96 and 100. Fluid to the motor 12 is now throttled across the valve bore port 95 of flow regulating device 16 by land 84 of the dual throttling valve 66 while motor displacement returning through conduit 98 is throttled across the port 93 of valve 66 by means of land 82. Displacement from the motor is thence conducted to the directional control valve 14 whence it is again returned to the reservoir 24 through the common motor return conduit 20 in which the throttle 18 is located. The dual throttle valve 66 will again be operated in response to the pressures across the throttle 18 in the same manner as previously recited for the other direction of motor operation.

Although the dual throttling valve 66 is operated in the same manner the lands of the throttling valve 66 previously functioning as meter-in and meter-out throttles now respectively function as meter-out and meter-in throttles. A sufficient back pressure is again created at the outlet side of the motor to cushion the same and the meter-out flow regulation by the valve prevents any overrunning of the motor. It should thus be noted that the fluid flow rate is regulated both to and from the motor by the utilization of a dual throttling device having a single pressure operating means responsive to the pressures ahead of and beyond a throttle in the common motor return line. The speed of the motor is thus not only accurately controlled in both directions of operation but the system also gives accurate control in spite of varying load conditions and does so regardless of opposing or overrunning loads on the motor.

While the form of embodiment of the invention as herein disclosed constitutes a preferred form, it is to be understood that other forms might be adopted, all coming within the scope of the claims which follow.

What is claimed is as follows:

1. In a hydraulic power transmission system including a pressure fluid source and a reversible fluid motor: a pressure delivery conduit and a low pressure return conduit connected to said source and through which fluid is respectively conducted to and from the motor; control means for selectively connecting said conduits to the motor for controlling the directional operation of the same; a first throttle in one of said conduits; a dual throttling device comprising a pair of pressure operated variable throttles for simultaneously regulating flow to and from the motor in either direction of operation; and operating means for the dual throttling device responsive to the difference in the pressures in the said one conduit ahead of and beyond the first throttle.

2. In a hydraulic power transmission system including a pressure fluid source and a reversible fluid motor: a pressure delivery conduit and a low pressure return conduit connected to said source and through which fluid is respectively conducted to and from the motor; control means for selectively connecting said conduits to the motor for controlling the directional operation of the same; a first throttle in the motor return conduit; a dual throttling device comprising a pair of pressure operated throttles for simultaneously regulating flow to and from the motor in either direction of operation; and operating means for the dual throttling device responsive to the difference in the pressures in the said one conduit ahead of and beyond the first throttle.

3. In a hydraulic power transmission system including a pressure fluid source and a reversible fluid motor: a pressure delivery conduit and a low pressure return conduit connected to said source and through which fluid is respectively conducted to and from the motor; control means for selectively connecting said conduits to the motor for controlling the directional operation of the same; a first throttle in one of said conduits; a pair of variable throttles through which flow to and from the motor must separately pass in either direction of motor operation; and operating means responsive to the difference in the pressures in the said one conduit ahead of and beyond the first throttle for causing said variable throttles to regulate the flow to and from the motor for regulating the speed of the motor.

4. In a hydraulic power transmission system including a pressure fluid source and a reversible fluid motor for driving a load device: a first throttle through which return flow from the motor must pass to the source in either direction of operation; a pair of variable throttles through which fluid must respectively separately pass from the source to the motor and from the motor back to the source in either direction of motor operation; and operating means for the variable throttles responsive to the difference in the pressures ahead of and beyond the first throttle for causing said pair of throttles to regulate the flow to and from the motor for controlling the speed of the motor.

5. In a hydraulic power transmission system including a pressure fluid source and a reversible fluid motor for driving a load device having two motor conduits connected thereto either of which may conduct fluid to or from the motor dependent on its direction of operation: a pressure delivery conduit and a low pressure return conduit connected to the source; control means for selectively connecting the pressure and return conduits to the motor conduits; a first throttle in one of said conduits; two variable throttles, one in each motor conduit; and a single operating means for the variable throttles responsive to the difference in the pressures ahead of and beyond the first throttle in the said one conduit for causing said variable throttles to simultaneously regulate the flow to and from the motor for controlling the speed of the motor.

6. In a hydraulic power transmission system for driving a reversible fluid motor at a controlled speed and upon which is imposed variable loads: a pressure fluid source for energizing the motor; a system of conduits including two conduits connected to the motor either of which may conduct fluid to or from the motor, and, connected to the pressure fluid source, a pressure delivery conduit and a common low pressure motor return conduit; a directional control valve interconnected to the conduits for selectively connecting the pressure delivery and the common motor return conduits to the motor conduits; a flow regulating device comprising two variable throttles having a single operating means, one of said throttles being in one of said conduits and the other throttle in another of said conduits; and a third throttle in still another of the conduits; said operating means being responsive to the difference in the pressures ahead of and beyond the third throttle in the said conduit in which it is incorporated for causing said variable throttles to simultaneously regulate the flow of fluid to and from the motor in either direction of operation.

7. In a hydraulic power transmission system for driving a reversible fluid motor at a controlled speed and upon which is imposed variable loads: a pressure fluid source for energizing the motor; a system of conduits including two conduits connected to the motor either of which may conduct fluid to or from the motor, and connected to the pressure fluid source, a pressure delivery conduit and a low pressure common motor return conduit; a directional control valve interconnected to the conduits for selectively connecting the pressure delivery and the common motor return conduits to the motor conduits; a flow regulating device comprising two variable throttles, one for each of the motor conduits; a third throttle in the common motor return conduit; and a single operating means for both variable throttles responsive to the difference in the pressures ahead of and beyond the third throttle in the common motor return conduit for causing said variable throttles to simultaneously regulate the flow of fluid to and from the motor in either direction of motor operation.

References Cited in the file of this patent

UNITED STATES PATENTS

| 1,467,522 | Amsler | Sept. 11, 1923 |
| 1,905,132 | Bishop et al. | Apr. 25, 1933 |
| 1,964,196 | Cuttat | June 26, 1934 |

FOREIGN PATENTS

| 270,652 | Switzerland | Dec. 1, 1950 |